United States Patent [19]
Wen-Der et al.

[11] Patent Number: 4,982,655
[45] Date of Patent: Jan. 8, 1991

[54] SAUCEPAN CAPABLE OF SETTING AMOUNT OF SOUP FINALLY LEFT THEREIN

[76] Inventors: Juang Wen-Der, 2F, No. 26-27, Lane 624, Sec. 2, Chung Shan Rd.; Yeh Wann-Fwu, No. 297, Jang Tsao Road, both of Jang Huah City, Taiwan

[21] Appl. No.: 479,613
[22] Filed: Feb. 13, 1990
[51] Int. Cl.$^5$ ............... A47J 27/21; G01F 23/22
[52] U.S. Cl. .................................. 99/337; 99/344; 116/109; 126/374; 126/388
[58] Field of Search ............... 99/344, 337, 331, 403; 116/101, 109; 219/324, 333; 126/374, 373, 388, 389; 220/20.5, 203; 222/572, 563

[56] References Cited

U.S. PATENT DOCUMENTS

| | | | |
|---|---|---|---|
| 220,048 | 9/1879 | Amos | 126/389 X |
| 832,274 | 10/1906 | Probst | 126/389 |
| 1,079,841 | 11/1913 | Cook | 126/388 |
| 1,304,195 | 5/1919 | Noeth | 126/374 X |
| 1,326,214 | 12/1919 | Schlesinger | 126/388 |
| 1,780,996 | 11/1930 | Carroll | 126/374 |
| 2,057,481 | 10/1936 | Ensign et al. | 126/388 |
| 2,222,098 | 11/1940 | Wittels | 126/388 X |
| 4,354,094 | 10/1982 | Massey et al. | 219/333 X |
| 4,649,898 | 3/1987 | Martinson | 99/344 X |
| 4,817,510 | 4/1989 | Kowalics et al. | 126/374 X |

FOREIGN PATENT DOCUMENTS

| | | | |
|---|---|---|---|
| 10408 | of 1903 | United Kingdom | 126/389 |
| 541776 | 12/1941 | United Kingdom | 126/388 |

Primary Examiner—Harvey C. Hornsby
Assistant Examiner—Scott J. Haugland
Attorney, Agent, or Firm—Bacon & Thomas

[57] ABSTRACT

A saucepan capable of setting amount of soup finally left therein, including a body having a nozzle portion communicated with inner portion thereof, and a cap provided with pressure-relieving hole and pressure valve, wherein a conduit provided with scale is extended into the nozzle portion and the position of lower opening of the conduit will determine the final level of the cooked soup, a thermal sensor being disposed at upper end of the conduit whereby when the cooked soup goes down below the lower opening of the conduit, because the pressure limit of the pressure valve is larger than the pressure existing in the conduit, the created steam will immediately alteratively escape through the conduit and the thermal sensor will sense the temperature of the escaping steam and indicate the controller to cut off power and emit warning sound so as to effectively control final amount of the soup left in the saucepan.

1 Claim, 4 Drawing Sheets

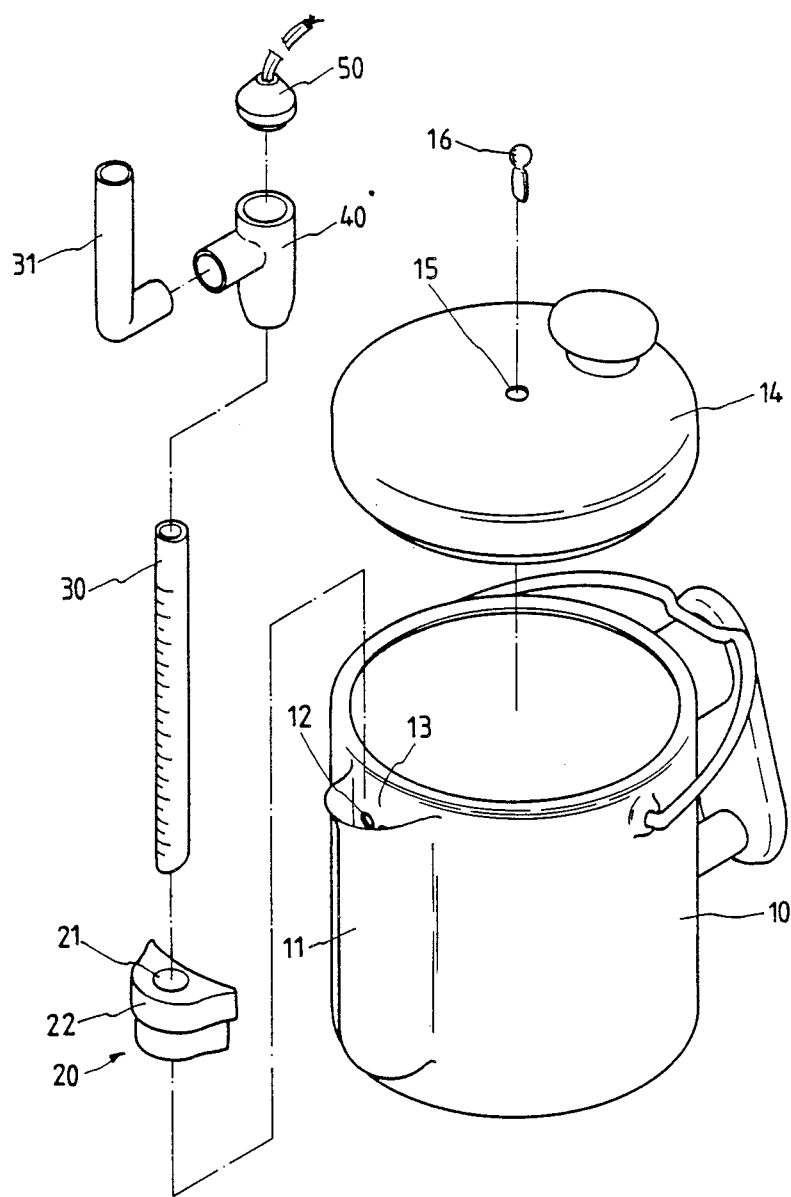
FIG·2

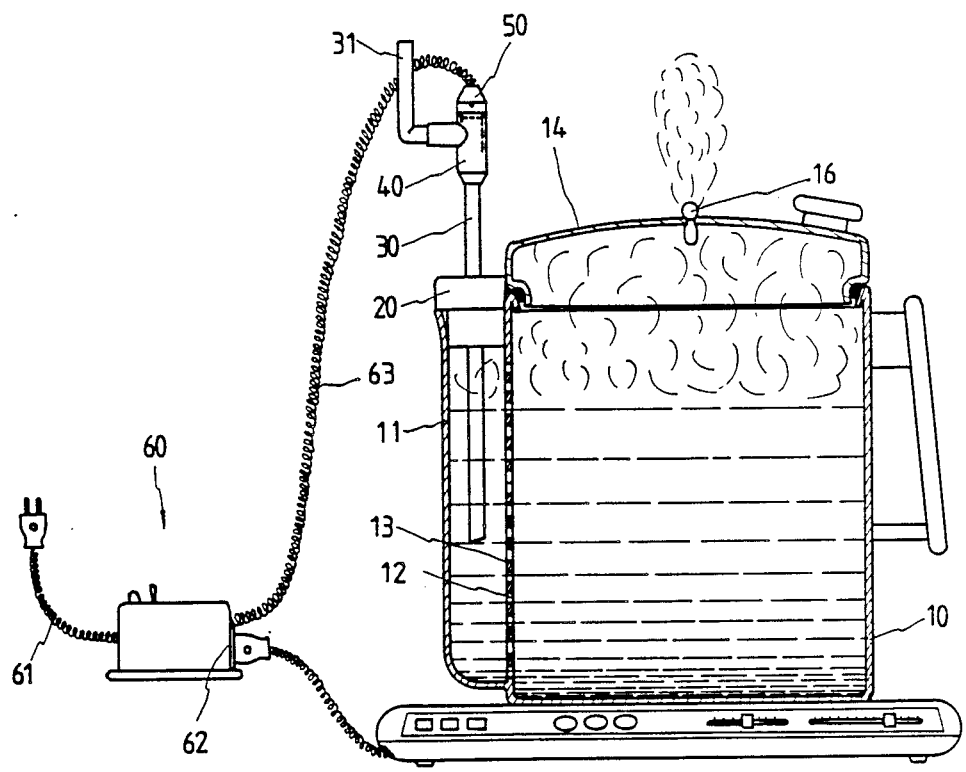
FIG·3

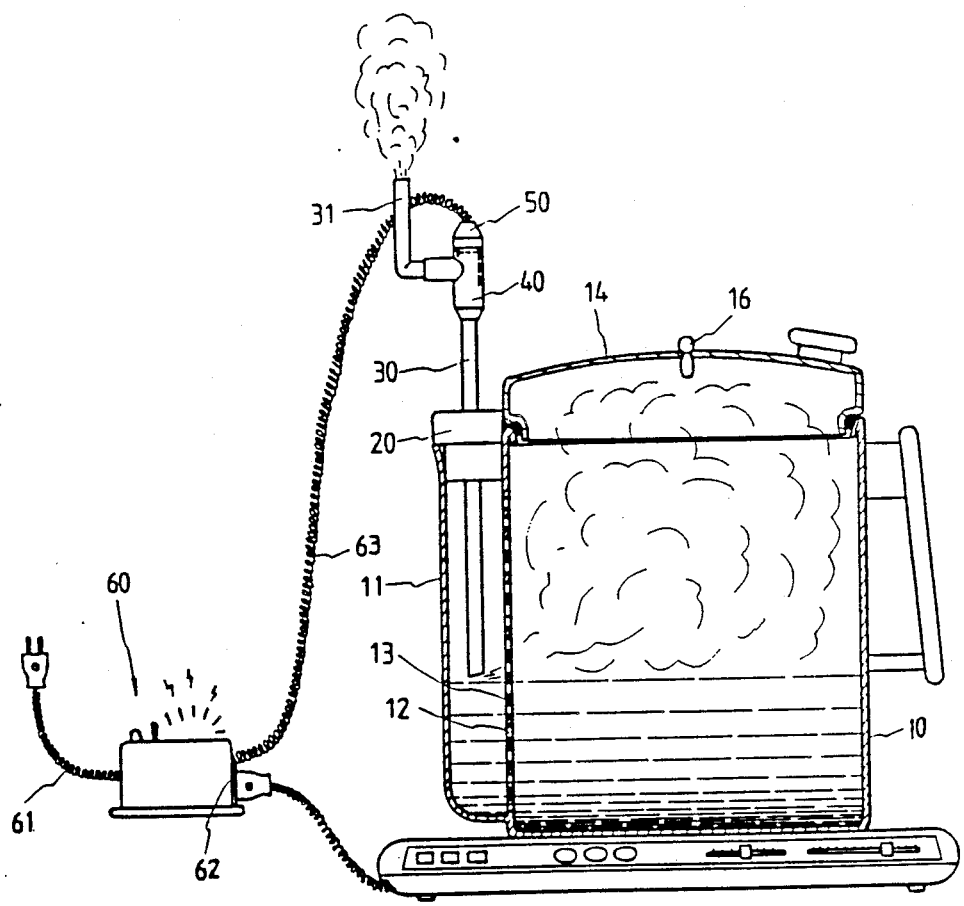
FIG·4

SAUCEPAN CAPABLE OF SETTING AMOUNT OF SOUP FINALLY LEFT THEREIN

BACKGROUND OF THE INVENTION

When cooking soup, the final amount thereof is often difficult to be effectively controlled. Furthermore, when the soup is concentrated, it is often over-cooked so that only little soup is left or even all the soup is dried up so as to cause much trouble.

Therefore, a saucepan capable of setting amount of soup finally left therein is required to eliminate the above shortcomings.

SUMMARY OF THE INVENTION

It is a primary object of this invention to provide a saucepan capable of setting amount of soup finally left therein, including a saucepan body having a nozzle portion communicated with inner portion of the body, and a cap provided with a pressure-relieving hole and a pressure valve. The water level in the nozzle portion is identical to that in the inner portion of the body, and sealing cork formed with a through hole is plugged on an opening of the nozzle portion. A conduit is inserted through the through hole of the sealing cork into the nozzle portion, the conduit being axially adjustable along the through hole.

A thermal sensor is disposed at upper end of the conduit to sense temperature of steam and actuate a controller. The conduit can be adjusted to a predetermined level scale and when the cooked soup goes down below lower opening of the conduit, because the pressure limit of the pressure valve is larger than the pressure existing in the conduit, the created steam in the saucepan will immediately alteratively escape through the conduit to relieve the pressure. The thermal sensor then will sense the temperature of the escaping steam and actuate the controller to cut off the power and emit warning sound so as to effectively control the final amount of the soup.

It is a further object of this invention to provide the above saucepan, wherein a screen formed with multiple through holes is disposed between the nozzle portion and inner portion of the saucepan body to unify the water level therein and prevent cooked food in the saucepan from entering the nozzle portion.

It is still a further object of this invention to provide the above saucepan, wherein the pressure-relieving hole formed on the cap can be designed with various diameters according to the volume of the saucepan so as to properly relieve the pressure. Moreover, the pressure limit for opening of the pressure valve is set in such a manner that it is larger than the atmosphere pressure in the conduit but smaller than the pressure in the saucepan when the soup is boiling so that the pressure valve will open to relieve pressure only when the soup boils and thus the heating effect is enhanced. (The saucepan cap is airtightly associated with the body.) In addition, when soup in the saucepan goes down below lower opening of the conduit, the steam in the saucepan will immediately alternatively escape through the conduit.

It is still a further object of this invention to provide the above saucepan, wherein the saucepan can be heated by an electric heater or a stove, and in case the heater is used, the thermal sensor can indicate the controller to cut off power and emit warning sound, while in case the stove is used, the controller will only emit warning sound, noticing a user to shut off stove fire so as to also control the final amount of left soup.

BRIEF DESCRIPTION OF THE DRAWINGS

FIG. 2 is an exploded view thereof;
FIG. 3 is a partially sectional view, showing the boiling state of the water contained in the saucepan;
and
FIG. 4 is a view according to FIG. 3, showing that the water level decreases to a position below the lower opening of the conduit of this invention.

DETAILED DESCRIPTION OF THE PREFERRED EMBODIMENT

Figure 1:
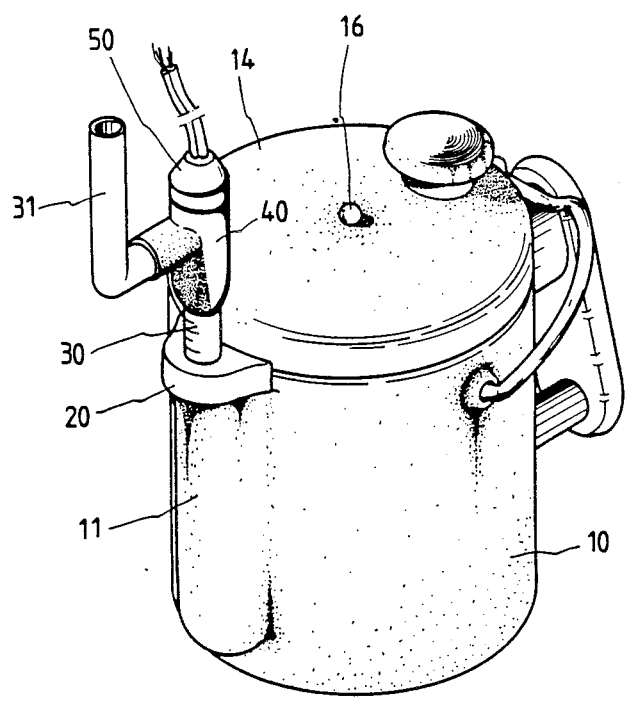
FIG. 1 is a perspective view of this invention.

Please refer to FIGS. 1 and 2. The present invention includes:

a body 10 having a nozzle portion 11 and a screen member 13 formed with multiple through holes 12 and disposed between the nozzle portion 11 and inner portion of the body 10, making the water level in the nozzle portion 11 identical to that in the inner portion of the body 10; the body 10 further having a cap 14 provided with a pressure-relieving hole 15 and a pressure valve 16;

a sealing cork 20 formed with a through hole 21 and plugged on upper opening of the nozzle portion 11;

a conduit 30 provided with scale and inserted through the through hole 21 of the sealing cork 20 into the nozzle portion 11, the conduit 30 being axially adjustable along the through hole 21;

a connecting member 40 having an upper opening, a lower opening and a lateral opening, the lower opening being connected with the conduit 30 and the lateral opening being connected with an exhalation pipe 31;

a thermal sensor 50 disposed on the upper opening of the connecting member 40; and a controller 60 connected to and actuated by the thermal sensor 50, having a power input cable 61, power output socket 62, thermal sensor wire 63, and inner control circuit.

Please now refer to FIG. 3, which shows a practical cooking state of this invention cooperating with a heater. The conduit 30 is first adjusted to a predetermined level scale and then the sealing cork 20 is plugged on the opening of the nozzle portion 11, and the power input cable 61 is connected to a domestic power socket while the plug of the heater is inserted into the power output socket 62 of the controller 60. (In case a stove is used for heating, then the socket 62 is not occupied.) When the soup in the saucepan is boiling, the pressure valve 16 is pushed open by steam pressure, permitted the steam to discharge through the pressure-relieving hole 15. (The pressure valve has a preset pressure limit for opening, and will allow pressure relieving in a boiling condition. This pertains to prior art and will not be further described herein.) When the cooked soup in the saucepan goes down below the lower opening of the conduit 30 during continuous heating procedure, as shown in FIG. 4, since the pressure valve will open only when the pressure in the saucepan is greater than the preset pressure limit thereof, and at this time, the pressure existing in the conduit 30 equals to an atmosphere pressure, therefore, when the level of the soup is lowered to a position below the lower opening of the conduit 30, the steam in the saucepan will immediately alternatively escape through the conduit 30 and connecting member 40 and finally discharge from the exhalation pipe 31. When the steam goes through the connecting member 40, the thermal sensor 50 will sense the temperature of the steam (the temperature of discharging steam is about 85° C. while the preset sensing temperature of the thermal sensor is about 60° C.) and indicate the controller 60 to cut off the power output from the output socket 62 and actuate an alarm circuit to emit warning sound (Such thermal sensor and alarm circuit pertain to prior art and will not be described herein.), informing the user of completion of cooking. (In case a stove is used, then the emitted warning sound can notice the user to shut off the fire.)

We claim:

1. A saucepan capable of setting an amount of soup finally left therein, comprising
   a hollow body having a nozzle portion that has an opening therein and is in communication with an inner portion of said body,
   a cap,
   a control means disposed in said nozzle portion,
   a controller having a power input cable, a power output socket a thermal sensor wire, means for emitting warning sound, and an inner control circuit,
   wherein
   said cap is provided with a pressure-relieving hole and a pressure valve having a certain pressure limit for opening, and wherein the nozzle portion communicates with the inner portion of the body such that when a liquid is placed in the body, the level of said liquid in said nozzle portion is identical to that in said inner portion of said body, and said control means is externally connected with said controller, said saucepan being characterized in that said control means comprises:
   a sealing cork formed with a through hole and plugged into the opening of said nozzle portion;
   a conduit provided with upper and lower openings and a scale and inserted through said through hole of said sealing cork into said nozzle portion, said conduit being axially adjustable in said through hole;
   a connecting member having an upper opening, a lower opening and a lateral opening, said lower opening being connected with said upper opening of the conduit;
   an exhalation pipe connected to said lateral opening and being open to the atmosphere; and
   a thermal sensor disposed on said upper opening of said connecting member and connected to said controller by said thermal sensor wire so that said controller can be actuated by said thermal sensor,
   the saucepan being capable of holding soup during cooking in a continuous heating process which generates steam in the body of the saucepan and during which the level of cooked soup in said saucepan goes down below the lower opening of said conduit,
   wherein the pressure limit of the pressure valve is greater than the pressure in the body of the saucepan when the level of the soup is below the lower end of the conduit so that the steam in said saucepan will escape through said conduit and connecting member and finally discharge from said exhalation pipe, and wherein the thermal sensor is responsive to the passage of steam through the connecting member when the level of soup is below the lower end of the conduit to actuate said controller to cut off power to the power output socket and emit said warning sound so as to effectively control the amount of soup finally left in said saucepan.

* * * * *